United States Patent
Yamada et al.

(10) Patent No.: US 10,228,515 B2
(45) Date of Patent: Mar. 12, 2019

(54) WOVEN FABRIC

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Atsuhiko Ito, Aichi-ken (JP); Takayoshi Yamamoto, Fukui-ken (JP)

(73) Assignees: TOYOTA BOSHOKU KABUSHIKI KAISHA, Aichi-Ken (JP); DAIKI CO., LTD., Fukui-Ken (JP)

( * ) Notice: Subject to any disclaimer, the term of this patent is extended or adjusted under 35 U.S.C. 154(b) by 29 days.

(21) Appl. No.: 15/600,055

(22) Filed: May 19, 2017

(65) Prior Publication Data
US 2017/0343736 A1  Nov. 30, 2017

(30) Foreign Application Priority Data

May 27, 2016  (JP) .................. 2016-106298

(51) Int. Cl.
*D03D 15/00* (2006.01)
*F21V 8/00* (2006.01)
(Continued)

(52) U.S. Cl.
CPC ............... *G02B 6/25* (2013.01); *D02G 3/446* (2013.01); *D03D 15/00* (2013.01); *G02B 6/001* (2013.01);
(Continued)

(58) Field of Classification Search
CPC ........ G02B 6/001; G02B 6/04; G02B 6/0006; G02B 6/0005; G02B 27/0994; G02B 6/08;
(Continued)

(56) References Cited

U.S. PATENT DOCUMENTS 8,129,294 B2 * 3/2012 Khokar .................... D02G 3/06
  442/185
8,408,766 B2 * 4/2013 Wilson .................... B60Q 3/68
  362/496

(Continued)

FOREIGN PATENT DOCUMENTS

JP  2006-39287   2/2006
JP  2010-267573  11/2010

OTHER PUBLICATIONS

U.S. Appl. No. 15/600,097 to Takamasa Yamada et al., which was filed May 19, 2017.

*Primary Examiner* — Robert H Muromoto, Jr.
(74) *Attorney, Agent, or Firm* — Greenblum & Bernstein, P.L.C.

(57) ABSTRACT

In a woven fabric woven from first constituent yarns as one of warps and wefts and second constituent yarns as the other, a part of the first constituent yarns are side emission type optical fibers; at least a part of the second constituent yarns are light shielding yarns; the woven fabric has a light shielding structure which shields light emission on a design surface side of the side emission type optical fiber; the light shielding structure includes a first group of light shielding yarns and a second group of light shielding yarns each formed of the 2 to 4 continuous light shielding yarns intersecting the side emission type optical fiber on the design surface side; the one light shielding yarn arranged between the first group of light shielding yarns and the second group of light shielding yarns and intersecting the side emission type optical fiber on a non-design surface side.

10 Claims, 5 Drawing Sheets

(51) Int. Cl.
  G02B 6/25 (2006.01)
  D02G 3/44 (2006.01)
  D03D 25/00 (2006.01)
  D02G 1/18 (2006.01)
  D03D 13/00 (2006.01)
  G02B 6/24 (2006.01)
(52) U.S. Cl.
  CPC ............... *D02G 1/18* (2013.01); *D02G 3/44* (2013.01); *D03D 13/004* (2013.01); *D10B 2401/20* (2013.01); *F21V 2200/15* (2015.01); *G02B 6/24* (2013.01)
(58) Field of Classification Search
  CPC .............. D03D 15/00; D03D 11/0088; D03D 15/0011; D03D 15/0077; D03D 13/004; D03D 15/0027; D03D 1/00; D03D 25/00
  See application file for complete search history.

(56) References Cited

U.S. PATENT DOCUMENTS

| | | | | |
|---|---|---|---|---|
| 8,469,562 B2* | 6/2013 | Marzorati | ............... | B60Q 3/78 362/488 |
| 2003/0156426 A1* | 8/2003 | Givoletti | ............... | B60R 13/02 362/556 |
| 2004/0037091 A1* | 2/2004 | Guy | ............... | D03D 15/00 362/582 |
| 2005/0146076 A1* | 7/2005 | Alexander | ............ | D03D 1/0088 264/257 |
| 2005/0223464 A1* | 10/2005 | Huang | ............... | A41D 13/01 2/102 |
| 2006/0087864 A1* | 4/2006 | Peng | ............... | B60Q 1/56 362/554 |
| 2007/0103928 A1* | 5/2007 | Goossen | ............ | D03D 1/0041 362/556 |
| 2014/0211498 A1* | 7/2014 | Cannon | ............ | B60Q 3/54 362/555 |
| 2017/0217366 A1* | 8/2017 | Kraemer | ............ | B60Q 3/54 |
| 2017/0261670 A1* | 9/2017 | Yamada | ............... | G02B 6/0008 |
| 2017/0297484 A1* | 10/2017 | Yamada | ............... | B60R 13/0243 |
| 2017/0342607 A1* | 11/2017 | Yamada | ............... | D03D 15/00 |
| 2017/0343736 A1* | 11/2017 | Yamada | ............... | G02B 6/001 |
| 2018/0017227 A1* | 1/2018 | Greene | ............... | G02B 6/0006 |
| 2018/0023776 A1* | 1/2018 | Greene | ............... | F21S 41/29 362/511 |
| 2018/0106446 A1* | 4/2018 | Meier | ............... | D03D 1/00 |
| 2018/0162268 A1* | 6/2018 | Yamada | ............... | D03D 15/00 |

* cited by examiner

WOVEN FABRIC

CROSS-REFERENCE TO RELATED APPLICATIONS

The present application claims priority under 35 U.S.C. § 119 of Japanese Application No. 2016-106298 filed on May 27, 2016, the disclosure of which is expressly incorporated by reference herein in its entirety.

BACKGROUND

1. Technical Field

The present invention relates to a woven fabric which is woven from a side emission type optical fiber and a light shielding yarn or the like constituting a light shielding structure for suppressing leakage of light from a circumferential edge part of a light emission part by this side emission type optical fiber and which has a distinct light emission part and thus can improve the designability in vehicle compartments when used, for example, as a skin material for vehicle interior.

2. Related Art

The use of optical fibers is expanding in technical fields of optical communication and the like along with popularization or the like of the Internet. Based on the feature of optical fibers that they can guide light made incident from one end to the other end for light transmission, the optical fibers are used also in applications including, for example, various illuminations and displays. For example, there are known optical fibers having a core layer including an acrylic resin as the main ingredient and a fabric including the optical fibers, the optical fibers and fabric being useful, for example, as automobile accessories such as interior decoration goods, wherein damage inflicted to the core layer is suppressed; wherein a clad layer has been removed; and wherein an exposure position thereof is precisely processed (for example, see JP 2006-39287 A).

Also, there is known an optical fiber woven fabric including an optical fiber woven fabric including optical fibers and normal yarns woven as warps or wefts and a light source delivering light to at least one end part of the optical fibers, the optical fiber woven fabric functioning as an illumination device which allows for entrance of light from the light source into the optical fibers, and thus can be utilized as automobile interior parts such as door trims and small parts (for example, see JP 2010-267573 A). This literature explains that uneven light emission of the optical fiber woven fabric can be reduced by regularly weaving the optical fibers and the normal yarns in this optical fiber woven fabric to control the woven texture and emission luminance to be in predetermined states.

SUMMARY

The fabric having the optical fibers described in JP 2006-39287 A, is useful, for example, as automobile accessories such as interior decoration goods. In the optical fiber woven fabric described in JP 2010-267573 A, uneven light emission can be reduced by controlling the woven texture and emission luminance to be in predetermined states. JP 2006-39287 A and JP 2010-267573 A however, nowhere mention that the leakage of light from the circumferential edge part renders the dot-shaped light emission part indistinct and reduces the designability of the woven fabric.

The present invention has been made in light of the above-mentioned conventional art situations. An object of this invention is to provide a woven fabric which is woven from a side emission type optical fiber and a light shielding yarn or the like constituting a light shielding structure for suppressing leakage of light from a circumferential edge part of a light emission part by this side emission type optical fiber and which has a distinct light emission part and thus can improve the designability in vehicle compartments when used, for example, as a skin material for vehicle interior.

In order to solve this problem, a first aspect of the invention is directed to a woven fabric woven from first constituent yarns as one of warps and wefts and second constituent yarns as the other, wherein:

a part of the first constituent yarns are side emission type optical fibers;

at least a part of the second constituent yarns are light shielding yarns;

the woven fabric has a light shielding structure which shields light emission on a design surface side of the side emission type optical fiber; and the light shielding structure is formed of:

a first group of light shielding yarns formed of the 2 to 4 continuous light shielding yarns intersecting the side emission type optical fiber on the design surface side;

a second group of light shielding yarns formed of the 2 to 4 continuous light shielding yarns intersecting the side emission type optical fiber on the design surface side; and the one light shielding yarn arranged between the first group of light shielding yarns and the second group of light shielding yarns and intersecting the side emission type optical fiber on a non-design surface side thereof.

A second aspect of the invention is directed to the woven fabric according to the first aspect, wherein a light emission part is formed between the light shielding structures; and, in the light emission part, the 4 to 8 continuous light shielding yarns intersect the side emission type optical fiber on the non-design surface side.

A third aspect of the invention is directed to the woven fabric according to the first or second aspect, wherein a plurality of the light shielding structures are continuously arranged in a direction of the side emission type optical fiber via the one light shielding yarn intersecting the side emission type optical fiber on the non-design surface side.

A fourth aspect of the invention is directed to the woven fabric according to the third aspect, wherein the number of the plurality of the light shielding structures arranged continuously is 2 to 6.

A fifth aspect of the invention is directed to any one of the second to fourth aspects, wherein, among the light shielding yarns, at least the light shielding yarns positioned at a circumferential edge part of the light emission part have a deep color.

A sixth aspect of the invention is directed to any one of the second to fifth aspects, wherein 1/1 woven textures of the side emission type optical fiber and the light shielding yarns are connected to both side parts of a site where the 4 to 8 continuous light shielding yarns intersect the side emission type optical fiber on the non-design surface side; and the site is used as a pale-color light emission part.

In the woven fabric of the present invention, a part of the first constituent yarns are side emission type optical fibers and at least a part of the second constituent yarns are light shielding yarns. The woven fabric has a light shielding structure which is formed of the following: a first group of light shielding yarns and a second group of light shielding yarns, each formed of the 2 to 4 continuous light shielding yarns intersecting the side emission type optical fiber on the design surface side; and the one light shielding yarn arranged between the first group of light shielding yarns and the second group of light shielding yarns and intersecting the side emission type optical fiber on the non-design surface side. This light shielding structure is arranged at a circumferential edge part of a light emission part formed of the side emission type optical fiber, thereby making it possible to suppress leakage of light from the circumferential edge part, to provide more distinct light emission from the light emission part, and to form the intended design surface.

Also, when a light emission part is formed between the light shielding structures and, in the light emission part, the 4 to 8 continuous light shielding yarns intersect the side emission type optical fiber on the non-design surface side, a dot-shaped distinct light emission part can be formed. A required number of the light emission parts are formed at predetermined positions, thereby making it possible to provide regularly aligned dot-shaped light emission parts and to form a design surface which offers a relaxed atmosphere. On the other hand, the dot-shaped light emission parts can also be used to form a design surface having a specific pattern.

Further, when a plurality of the light shielding structures are continuously arranged in a direction of the side emission type optical fiber via the one light shielding yarn intersecting the side emission type optical fiber on the non-design surface side, the leakage of light from the circumferential edge part of the light emission part can be suppressed more sufficiently so that a more distinct light emission part can be formed.

Also, when the number of the plurality of the light shielding structures arranged continuously is 2 to 6, the leakage of light can be suppressed more sufficiently, and the intervals between the respective dot-shaped light emission parts can be made preferable from the viewpoint of designability.

Further, when, among the light shielding yarns, at least the light shielding yarns positioned at a circumferential edge part of the light emission part have a deep color, the light leakage can be suppressed more reliably so that a more distinct light emission part can be formed, and preferable designability can be obtained.

Further, in the case where 1/1 woven textures of the side emission type optical fiber and the light shielding yarns are connected to both side parts of a site in which the 4 to 8 continuous light shielding yarns intersect the side emission type optical fiber on the non-design surface side and where the site is used as a pale-color light emission part, the distinct light emission parts and the pale-color light emission parts are arranged at desired positions, thereby enabling a wide range of designability expressions.

Figure 3:
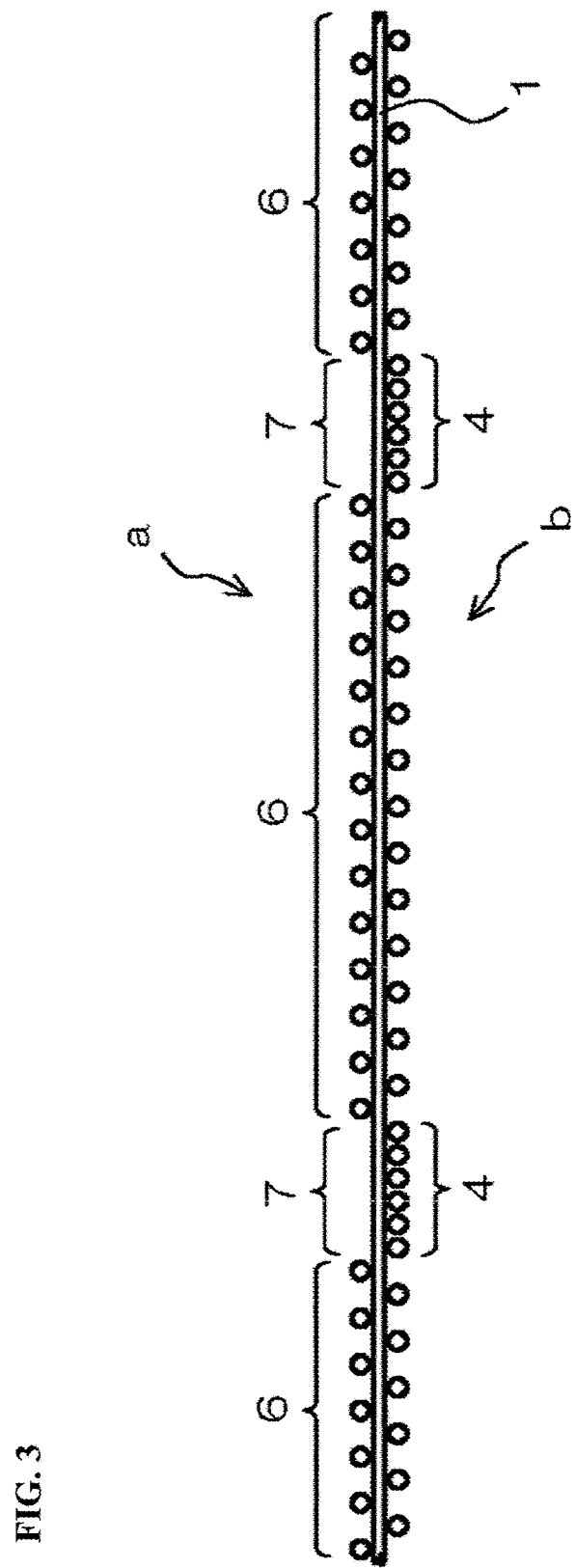
FIG. 3 is a schematic explanatory view showing one example of woven texture having no light shielding structure when viewed from the side surface direction of the side emission type optical fiber.
Figure 4:
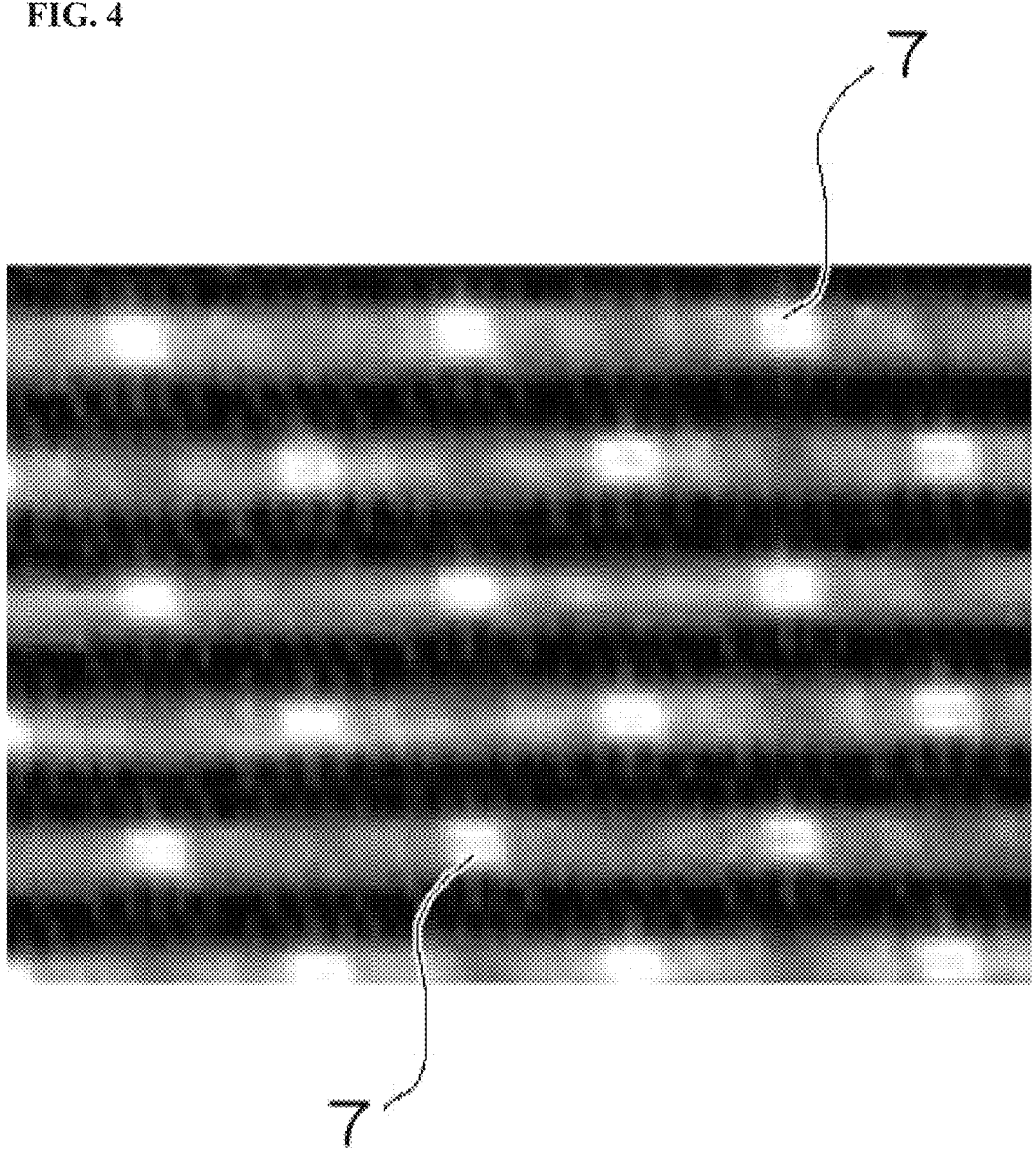
FIG. 4 is a schematic explanatory view showing a state where the side emission type optical fiber of the woven fabric shown in FIG. 3 guides light, so that dot-shaped light emission parts made indistinct by light leakage are formed.

It is noted that, even if side emission type optical fibers are used as a part of the first constituent yarns and light emission sites are provided at predetermined positions, when the woven fabric has no light shielding structure, for example, in such a form that 1/1 woven textures of the side emission type optical fiber and the light shielding yarns are continuously arranged on both side parts of the respective light emission sites as shown in FIG. 3, pale light emission is generated on both the side parts of the respective light emission sites due to the leakage of light from the 1/1 woven textures. Therefore, indistinct pale-color light emission parts are formed as shown in FIG. 4. Such a woven fabric unfavorably deteriorates the designability in vehicle compartments when used, for example, as a skin material for vehicle interior.

DETAILED DESCRIPTION

Hereinafter the present invention will be described in detail with reference to the drawings.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings making apparent to those skilled in the art how the forms of the present invention may be embodied in practice.

A woven fabric 10 of the present invention is a woven fabric 10 woven from first constituent yarns as one of warps and wefts and second constituent yarns as the other. Also, a part of the first constituent yarns are side emission type optical fibers 1, and at least a part of the second constituent yarns are light shielding yarns. Further, the woven fabric 10 has a light shielding structure 2 which shields light emission on a design surface side a of the side emission type optical fiber 1. This light shielding structure 2 is formed of the following: a first group 21 of light shielding yarns formed of 2 to 4 continuous light shielding yarns intersecting the side emission type optical fiber 1 on the design surface side a; a second group 22 of light shielding yarns formed of 2 to 4 continuous light shielding yarns intersecting the side emission type optical fiber 1 on the design surface side a; and one light shielding yarn 23 arranged between the first group 21 of light shielding yarns and the second group 22 of light shielding yarns and intersecting the side emission type optical fiber 1 on a non-design surface side b.

Here, the term "light shielding yarns" is used to mean that yarns have light shielding function, and examples of the light shielding yarns include multifilaments made of synthetic resins, to which light shielding properties are imparted, for example, by a pigment. Also, normal multifilaments or the like made of synthetic resins, to which no light shielding property is imparted, may be used at a position spaced apart from a light emission part 5. Further, all of the first constituent yarns and second constituent yarns, except the side emission type optical fiber 1, may be light shielding yarns.

Figure 1:
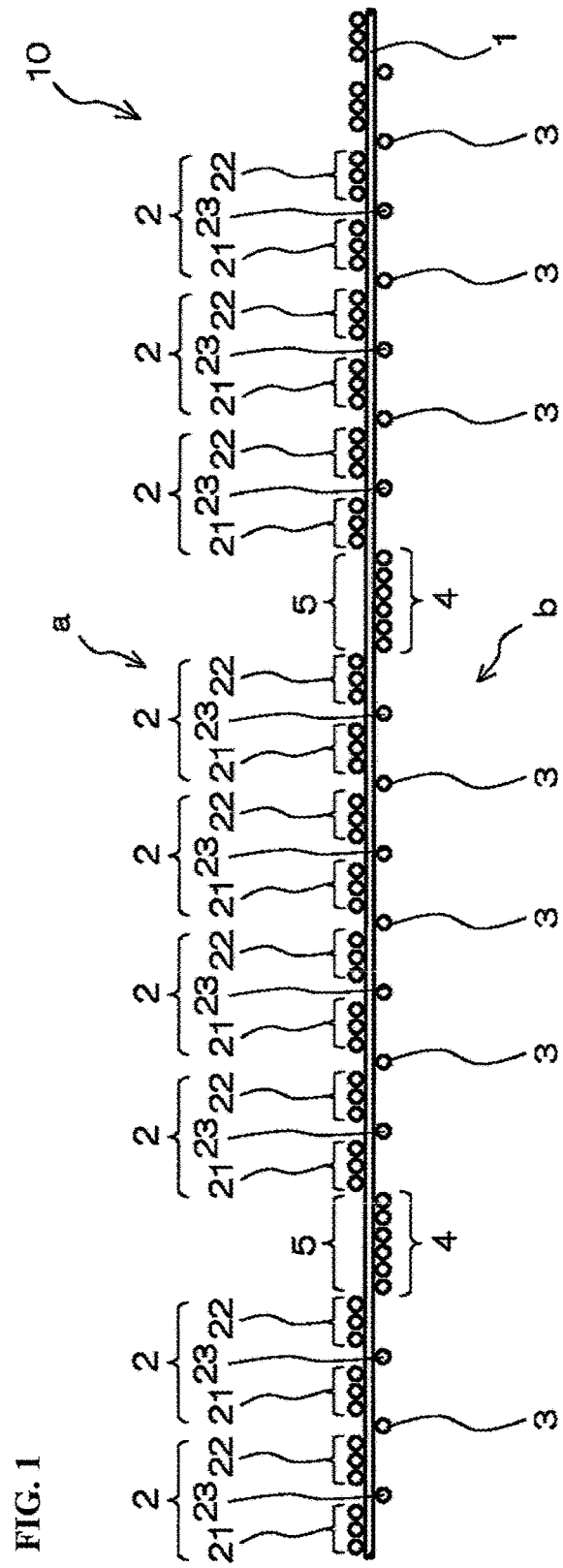
FIG. 1 is a schematic explanatory view showing one example of woven texture of a woven fabric according to the present invention when viewed from a side surface direction of a side emission type optical fiber.

In the first group 21 of light shielding yarns and second group 22 of light shielding yarns, the number of the 2 to 4 continuous light shielding yarns intersecting the side emission type optical fiber 1 on the design surface side a is 2 to 4, preferably 3 (see FIG. 1). Three continuous light shielding yarns are enough to suppress light leakage, and can suppress the reduction in strength of the woven fabric 10.

Figure 2:
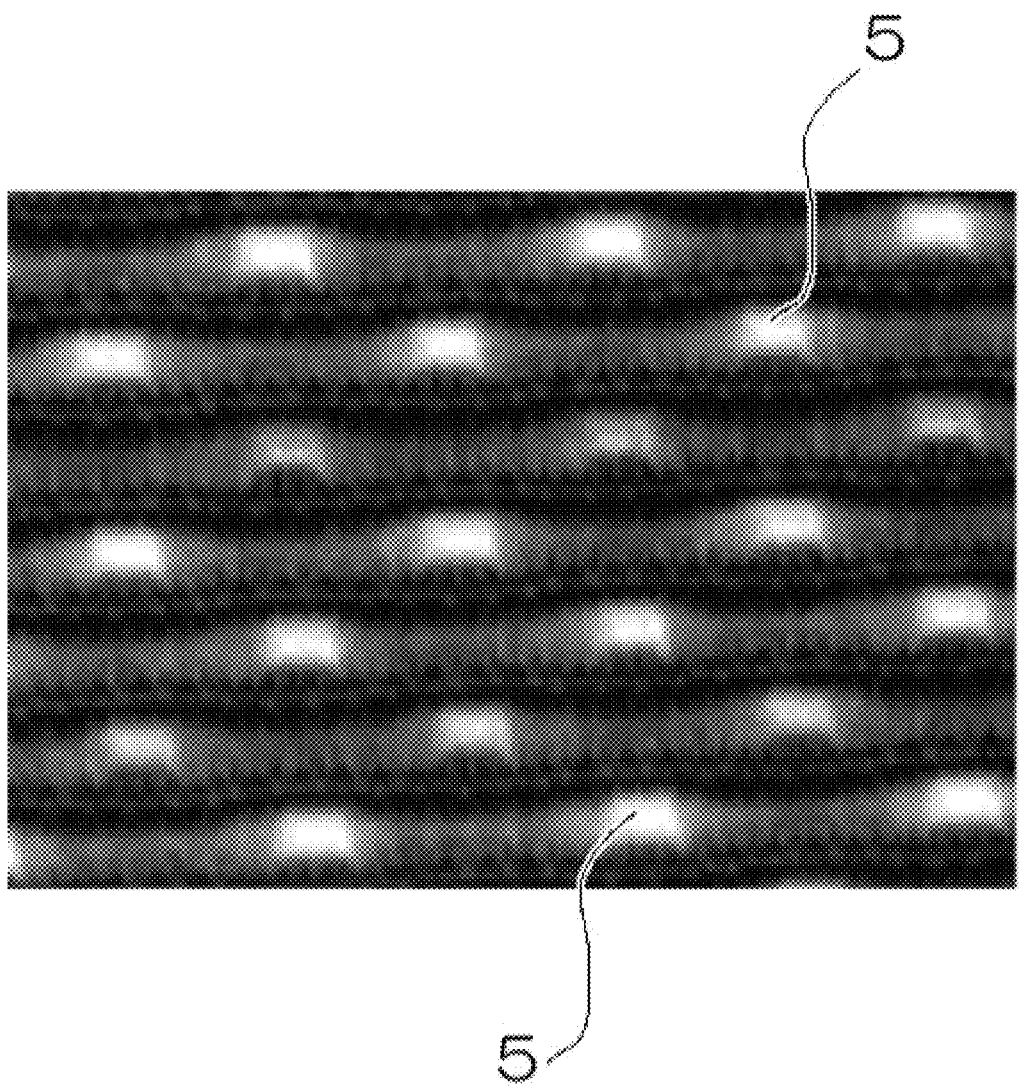
FIG. 2 is a schematic explanatory view showing a state where the side emission type optical fiber of the woven fabric shown in FIG. 1 guides light, so that distinct dot-shaped light emission parts are formed.

The light emission part 5 is formed between the light shielding structures 2. In this light emission part 5, the continuous light shielding yarns intersect the side emission type optical fiber 1 on the non-design surface side b, and the side emission type optical fiber 1 is exposed on the design surface side a. The number of the continuous light shielding yarns intersecting the side emission type optical fiber 1 (see groups 4 of six light shielding yarns for forming the light emission part 5 in FIG. 1) on the non-design surface side b is preferably 3 to 9, especially preferably 4 to 8, further preferably 5 to 7, from the viewpoint of forming distinct light emission parts 5 (see FIG. 2) and allowing the woven fabric 10 to have sufficient strength.

Further, only one light shielding structure 2 may be arranged between the light emission parts 5. However, from the viewpoint of sufficiently suppressing light leakage and improving the designability, it is preferable to arrange a plurality of light shielding structures 2 and to define the intervals between the respective light emission parts 5 as a predetermined distance. Specifically, a plurality of the light shielding structures 2 are preferably continuously arranged, in a direction of the side emission type optical fiber 1, via one light shielding yarn (see one light shielding yarn 3 interposed between the respective light shielding structures 2 in FIG. 1) intersecting the side emission type optical fiber 1 on the non-design surface side b. The number of the continuously arranged light shielding structures 2 is not especially limited. However, when this number is excessively high, the light emission parts 5 are spaced apart too much, so that the designability may be reduced, for example, when the woven fabric 10 is used as a skin material for vehicle interior. Thus, from the viewpoint of designability, the number of the plurality of continuously arranged light shielding structures 2 is preferably 2 to 6, especially preferably 3 to 5 (in the woven fabric 1 shown in FIG. 1, the number of the plurality of continuously arranged light shielding structures 2 is 4).

For example, multifilaments made of a synthetic resin, which contain a pigment or the like can be used as the light shielding yarns, and the material therefor is not especially limited. However, at least the light shielding yarns positioned at a circumferential edge part of the light emission part 5 preferably have a deep color. When the light shielding yarns have a deep color, the light leakage at the circumferential edge part of the light emission part 5 is suppressed more sufficiently, and the light emission part 5 can be made distinct. More preferably, the light shielding yarns at other sites than the circumferential edge part of the light emission part 5 also have a deep color. Thus, when all the light shielding yarns have a deep color, even if many light emission parts 5 are formed, the light leakage between the respective light emission parts 5 is sufficiently suppressed so that the light emission parts 5 can be made more distinct.

It is noted that the term "deep color" means a color tone having low lightness and chroma, and examples thereof include black, navy blue and brown.

Further, the light shielding yarns are used both as the first constituent yarns and as the second constituent yarns, and the fineness of the light shielding yarns woven, especially, in the vicinity to a side part of the side emission type optical fiber 1, as the first constituent yarns, is preferably smaller than that of the light shielding yarns or the like used as the second constituent yarns. The reason why the fineness of the light shielding yarns used as the first constituent yarns is preferably smaller than that of the light shielding yarns or the like used as the second constituent yarns is that the side emission type optical fiber 1 has a diameter smaller than that of a common multifilament made of a synthetic resin or the like.

In brief, if the diameter of the light shielding yarns woven in parallel with the side emission type optical fiber 1 is almost identical with that of the side emission type optical fiber 1, the light shielding yarns are difficult to appear on the design surface side a, whereby the light emission parts 5 can be made more distinct. Also, if the light shielding yarns or the like woven almost orthogonally to the side emission type optical fiber 1 have a larger diameter, the appearance of the side emission type optical fiber 1 on the outermost surface of the woven fabric 10 is suppressed, whereby the abrasion of the side emission type optical fiber 1 can be suppressed. Further, the woven fabric 10 can have sufficient strength while maintaining the performance as a design surface including the light emission parts 5.

The fineness ($d_1$) of the light shielding yarns woven, especially, in the vicinity of the side part of the side emission type optical fiber 1 as the first constituent yarns is not especially limited, and can be defined for example within a range of from 20 to 2000 dtex, and preferably ranges from 35 to 1000 dtex, more preferably ranges from 50 to 700 dtex. Also, when the fineness ($d_1$) of the light shielding yarns used as the first constituent yarns is compared with the fineness ($d_2$) of the light shielding yarns or the like used as the second constituent yarns, the respective finenesses may be identical, or either one of them may be larger than the other. The fineness ($d_2$) is preferably larger than the fineness ($d_1$). When the fineness ($d_1$) is smaller than the fineness ($d_2$), the flexibility in a direction along the longitudinal direction of the light shielding yarns used as the first constituent yarns increases as compared with the case where both of the finenesses ($d_1$) and ($d_2$) are large, whereby the flexibility of the entire textile can be obtained while the light shielding properties by virtue of the light shielding yarns used as the second constituent yarns are sufficiently ensured.

Also, twisted yarns may be used as the light shielding yarns used as the second constituent yarns, for example, as the light shielding yarns used to form the first group 21 of light shielding yarns and the second group 22 of light shielding yarns. When twisted yarns are used, the yarns are untwisted by tension applied in a weaving direction during weaving, the woven fabric becomes bulky, whereby light leakage at the circumferential edge part of the respective light emission parts 5 can be suppressed, thereby making the light emission parts 5 more distinct. Further, it is possible to suppress the appearance of the side emission type optical fiber 1 on the outermost surface of the woven fabric 10, thereby suppressing the abrasion of the side emission type optical fiber 1. Also, the twisting direction may be either Z direction or S direction, but Z-twisting is preferred in consideration of the friction coefficient or the like of the surface of the woven fabric 10. While the number of twists is also not especially limited, medium twisted yarns ranging from 150 to 1000 T/m, especially from 150 to 850 T/m are preferably used in order to sufficiently obtain the function/effect as described above.

Figure 5:
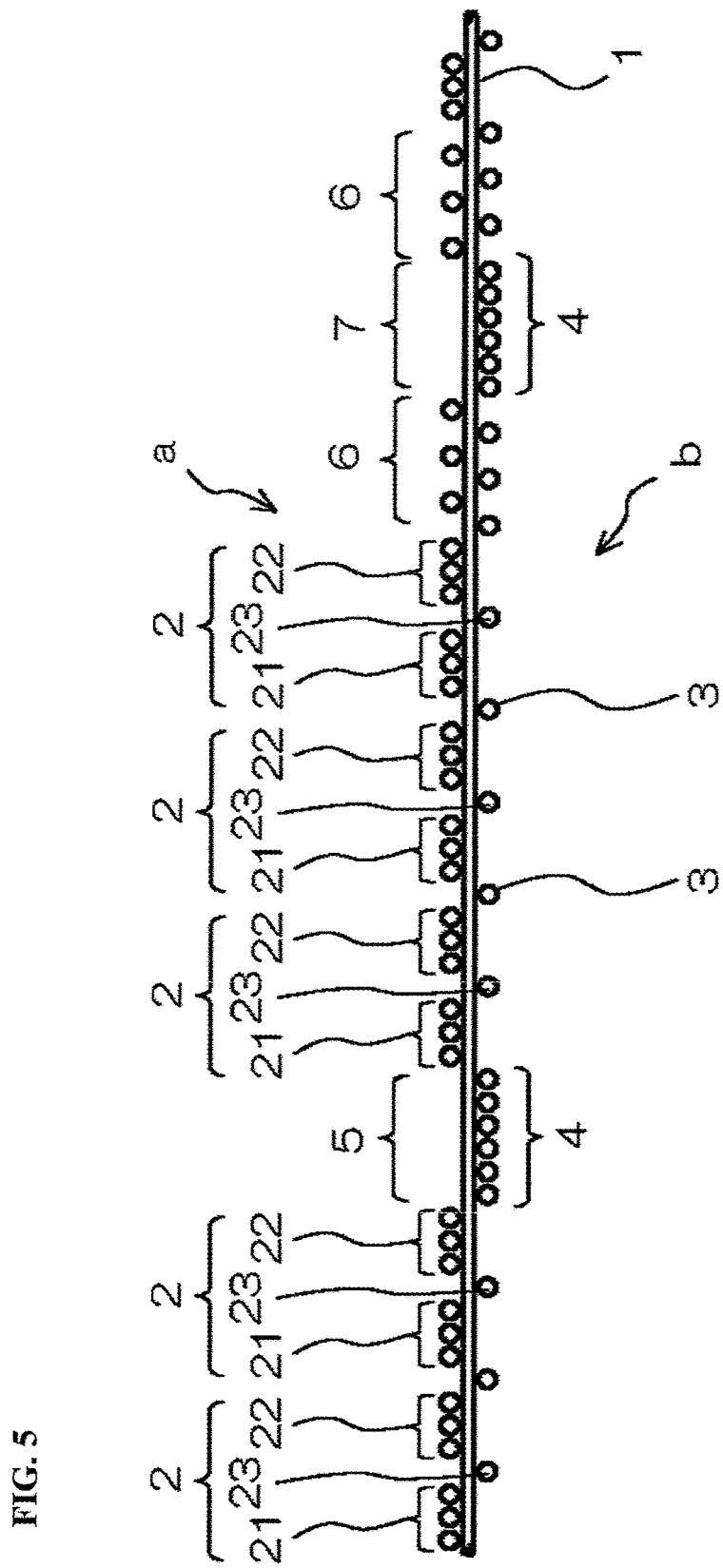
FIG. 5 is a schematic explanatory view showing a woven fabric including a distinct light emission part having a light shielding structure and a pale-color light emission part formed by connecting 1/1 textures of the side emission type optical fiber and the light shielding yarns on both side parts of a site which emits light, when viewed from the side surface direction of the side emission type optical fiber.

Further, the light emission part 5 having a specific configuration is formed between the light shielding structures 2 as described above, and 1/1 woven textures 6 of the side emission type optical fiber 1 and the light shielding yarns can also be connected to both side parts of a site where 4 to 8 continuous light shielding yarns intersect the side emission type optical fiber 1 on the non-design surface side b (see FIG. 5). Thus, at the site where the 1/1 woven textures 6 are connected to both side parts thereof, the side emission type optical fiber 1 emits light, but light leaks at both the side parts. Thus, the light emission part 5 formed is indistinct, unlike the distinct light emission part 5 formed at the site between the light shielding structures 2, and a pale light emission part having low luminance, i.e., a pale-color light emission part 7 is formed (see FIG. 5). The pale-color light emission part 7 is provided in place in consideration of the arrangement of the light emission parts 5 between the respective light shielding structures 2, thereby enabling a wider range of design expressions.

Side emission type optical fibers 1, emitting light, but light leaks at the side parts, are normally composed of a core layer and a clad layer, and have a structure such that the outer periphery of the core layer is covered by the clad layer. Also, the core layer and the clad layer may each be either a single layer or a laminate of a plurality of layers. Side emission type optical fibers 1, for example, are configured so that dispersing light leaks to the external at the side parts by including a light dispersing agent in the core layer without total reflection at the interface between the core layer and the clad layer, and dispersing light leaks to the external at the side parts by being removed a part of the clad layer. In addition, examples of the side emission type optical fibers 1 include various optical fibers such as optical fibers made of a resin and quartz-based optical fibers. The optical fibers used in the present invention are woven in the woven fabric 10, and thus are preferably optical fibers made of a resin, which are flexible, have excellent bending impact and the like and can be easily woven.

Also, the side emission type optical fiber 1 such as the existing optical fiber made of a resin has a diameter of about 0.1 to 10 mm, but the side emission type optical fiber 1 having a diameter of 0.25 to 1.0 mm, especially 0.25 to 0.5 mm is preferably used from the viewpoint of easiness to weave, fineness of the light shielding yarns used as the first constituent yarns as described above, and the like. This side emission type optical fiber 1 is shown as if the number thereof is only one in FIG. 1 or the like in which this fiber is viewed from a side, but two to four, especially two to three side emission type optical fibers 1 may be arranged in parallel in a direction almost orthogonal to the direction in which the side emission type optical fiber 1 is woven. Thus, distinct light emission parts 5 having higher luminance can be formed.

Further, in order to allow the side emission type optical fibers 1 woven in the woven fabric 10 to emit light, the tip end parts of a plurality of side emission type optical fibers 1 are bundled together, and a light source is arranged at a position facing their end surfaces. The light source is not especially limited, but LED is normally used. Light is delivered and guided from the LED light source toward the end surfaces of the side emission type optical fibers 1 bundled together, so that the side emission type optical fibers 1 emit light and that the light emission parts 5 are formed. Also, when the tip end parts of the plurality of side emission type optical fibers 1 are bundled together, all the side emission type optical fibers 1 woven in the woven fabric 10 may be bundled together, but a plurality of side emission type optical fiber bundles in which a predetermined number of the side emission type optical fibers 1 are bundled together are normally employed.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Further, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoroethylene resins and trifluoroisopropyl methacrylate resins.

Multifilaments made of a synthetic resin, to which light shielding properties are imparted, for example, by incorporation of a pigment, can be used as the light shielding yarns. The material for the multifilaments is not especially limited, and multifilaments made of various synthetic resins can be used. Examples of this synthetic resin include the following: polyamide-based resins such as nylon 6 and nylon 66; polyester-based resins such as polyethylene terephthalate, polybutylene terephthalate and polytrimethylene terephthalate; polyacrylic resins; and polyolefin-based resins such as polypropylene. As the synthetic resin, a polyamide-based resin and a polyester-based resin are especially preferred.

The loom used for weaving the woven fabric 10 using the side emission type optical fibers 1 as warps or wefts and the light shielding yarns as warps and wefts is not particularly limited, and examples of the loom include a rapier loom (Models "G6500, R9500" manufactured by Itema Weaving Ltd. (Italy)), a jacquard loom (Models "CX880, DX110, LX1602, SXB" manufactured by STÄUBLI (France)) and a dobby loom (Model "UVIVAL500" manufactured by STÄUBLI (France)).

Further, the intended use of the woven fabric 10 is not especially limited, and the woven fabric 10 can be used, for example, as a skin material for vehicle interior. In this case, the woven fabric is adhered to a substrate for vehicle interior to form a design surface in a vehicle compartment. The substrate for vehicle interior is normally a molded body made of a synthetic resin, and molded into a shape of a vehicle interior material such as a door trim or a roof trim by a press-molding method involving heating and pressurization by means of a molding die.

Also, the synthetic resin used to mold the substrate for vehicle interior is not especially limited, and polyolefin resins such as polyethylene and polypropylene and polyamide resins such as nylon 6 and nylon 66 are used. Among these synthetic resins, polypropylene is preferred from the viewpoint of easiness to mold, strength and the like. Also, a fiber reinforced resin including glass fiber, carbon fiber or the like can be used in order to improve the physical properties such as rigidity.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although particular structures, materials and embodiments of the present invention have been described in detail and referred to herein, the present invention is not intended to be limited to the particulars disclosed herein; rather, the present invention extends to all functionally equivalent structures, methods and uses, such as are within the scope of the appended claims.

The present invention can be utilized especially in the technical field of woven fabrics which include a plurality of dot-shaped light emission parts, are used, for example, as skin materials for vehicle interior, and are usable to form a design surface in a vehicle compartment. Especially, the present invention is useful in the technical field of skin materials for vehicle interior materials such as a door trim and a roof trim.

What is claimed is:

1. A woven fabric woven from first constituent yarns as one of warps and wefts and second constituent yarns as the other, wherein:
    a part of the first constituent yarns are side emission type optical fibers;
    at least a part of the second constituent yarns are light shielding yarns;
    the woven fabric has a light shielding structure which shields light emission on a design surface side of the side emission type optical fiber; and
    the light shielding structure is formed of:
        a first group of light shielding yarns formed of the 2 to 4 continuous light shielding yarns intersecting the side emission type optical fiber on the design surface side;
        a second group of light shielding yarns formed of the 2 to 4 continuous light shielding yarns intersecting the side emission type optical fiber on the design surface side; and
        the one light shielding yarn arranged between the first group of light shielding yarns and the second group of light shielding yarns and intersecting the side emission type optical fiber on a non-design surface side of the side emission type optical fiber.

2. The woven fabric according to claim 1, wherein a light emission part is formed between the light shielding structures; and, in the light emission part, the 4 to 8 continuous light shielding yarns intersect the side emission type optical fiber on the non-design surface side.

3. The woven fabric according to claim 2, wherein a plurality of the light shielding structures are continuously arranged in a direction of the side emission type optical fiber via the one light shielding yarn intersecting the side emission type optical fiber on the non-design surface side.

4. The woven fabric according to claim 3, wherein the number of the plurality of the light shielding structures arranged continuously is 2 to 6.

5. The woven fabric according to any one of claim 2, wherein,
    among the light shielding yarns, at least the light shielding yarns positioned at a circumferential edge part of the light emission part have a deep color.

6. The woven fabric according to claim 2, wherein:
    1/1 woven textures of the side emission type optical fiber and the light shielding yarns are connected to both side parts of a site where the 4 to 8 continuous light shielding yarns intersect the side emission type optical fiber on the non-design surface side; and
    the site is used as a pale-color light emission part.

7. The woven fabric according to claim 1, wherein a plurality of the light shielding structures are continuously arranged in a direction of the side emission type optical fiber via the one light shielding yarn intersecting the side emission type optical fiber on the non-design surface side.

8. The woven fabric according to claim 7, wherein the number of the plurality of the light shielding structures arranged continuously is 2 to 6.

9. The woven fabric according to claim 7, wherein, among the light shielding yarns, at least the light shielding yarns positioned at a circumferential edge part of the light emission part have a deep color.

10. The woven fabric according to claim 7, wherein:
    1/1 woven textures of the side emission type optical fiber and the light shielding yarns are connected to both side parts of a site where the 4 to 8 continuous light shielding yarns intersect the side emission type optical fiber on the non-design surface side; and
    the site is used as a pale-color light emission part.

* * * * *